United States Patent

Stenman

[11] Patent Number: 6,068,927
[45] Date of Patent: *May 30, 2000

[54] SUSPENDED DUMP BODIES

[75] Inventor: Rolph H. Stenman, Victoria, Australia

[73] Assignee: Pacific Dunlop Limited, Victoria, Australia

[*] Notice: This patent issued on a continued prosecution application filed under 37 CFR 1.53(d), and is subject to the twenty year patent term provisions of 35 U.S.C. 154(a)(2).

[21] Appl. No.: 08/882,332

[22] Filed: Jun. 25, 1997

Related U.S. Application Data

[62] Division of application No. 08/318,389, Oct. 5, 1994, abandoned.

[51] Int. Cl.$^7$ ..................................................... B60R 13/01
[52] U.S. Cl. ........................... 428/409; 428/137; 428/131; 428/99; 296/39.1; 296/39.2; 156/174
[58] Field of Search ................................. 428/137, 131, 428/99, 409; 296/39.1, 39.2; 156/174

[56] References Cited

U.S. PATENT DOCUMENTS

| | | | |
|---|---|---|---|
| 2,984,286 | 5/1961 | Copenhefer | 154/1 |
| 3,514,151 | 5/1970 | Hacker | 296/39 |
| 4,116,485 | 9/1978 | Svensson | 296/39 R |
| 4,162,063 | 7/1979 | Nissen et al. | 267/73 |
| 4,800,601 | 1/1989 | DeCaro | 5/123 |

*Primary Examiner*—William P. Watkins, III
*Attorney, Agent, or Firm*—Burns, Doane, Swecker & Mathis, L.L.P.

[57] ABSTRACT

A bulk material handling wear mat of elastomeric/polymeric material having good wear and impact resistance is disclosed and is suitable for use as a wear lining in an off road haulage vehicle in which the mat is formed as a substantially planar mat having first and second opposing surfaces one of the opposing surfaces forming an exposed wear surface when in use in which the surface is under compression. There is also disclosed an adjustable rope support with apertures and a fabric reinforcement for the wear mat.

6 Claims, 5 Drawing Sheets

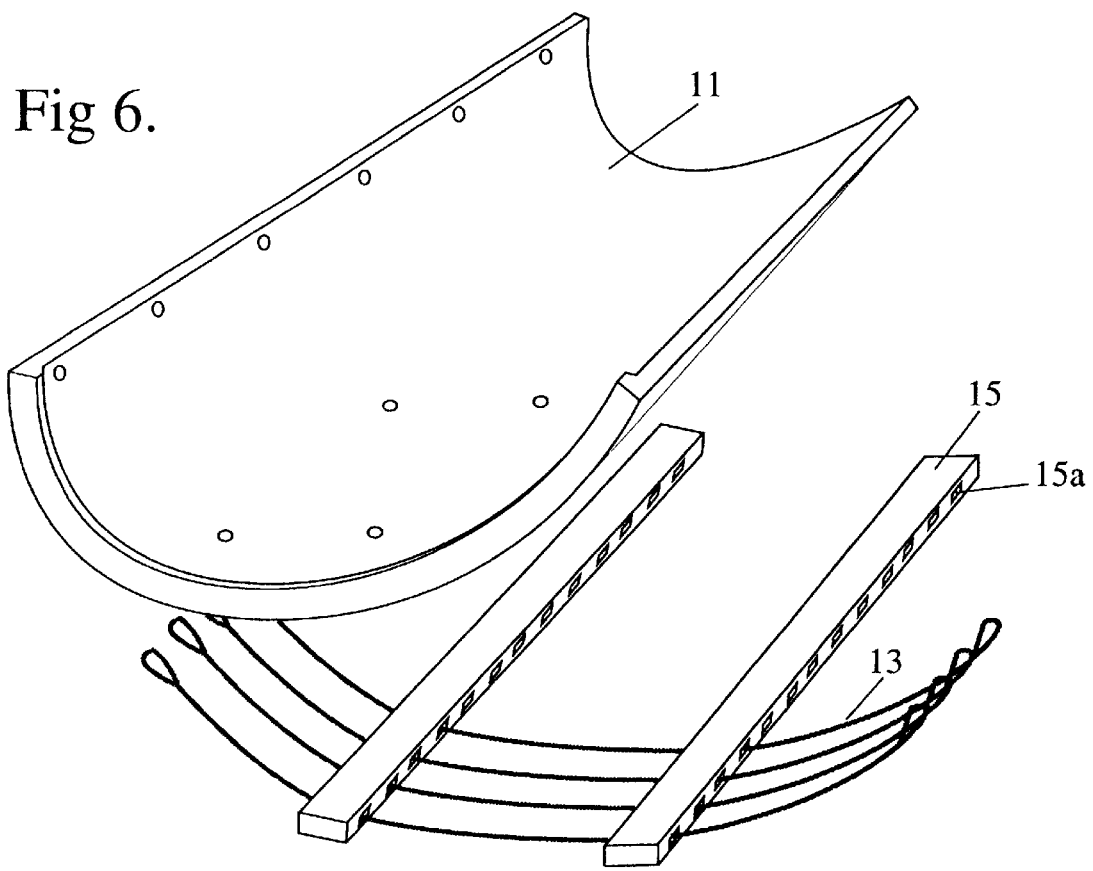

SUSPENDED DUMP BODIES

This application is a divisional of application Ser. No. 08/318,389, abandoned filed Oct. 5, 1994.

BACKGROUND TO INVENTION

The present invention relates to a wear mat for bulk material carrying vehicles and in particular extra large off road haulage vehicles such as those used for carrying ore, broken rock, coal or the like used on mining sites. Specifically the invention relates to the production of an elastomeric lining material for the vehicle body and support means for the lining material.

DISCUSSION OF THE PRIOR ART

A bulk material carrying container is disclosed in U.S. Pat. No. 4116485 assigned to SKEGA AB comprising a framework including a base and a pair of opposing generally parallel upright sides carried by the base. An elastomeric sheet is secured to and suspended between the sides so that it forms a generally concave receptacle into which bulk material and the like may be dropped. The sheet is dimensioned so that it is substantially freely suspended between the sides. A multiplicity of sheet supporting, flexible ropes are anchored to the sides and engage an underside of the sheet so as to support the sheet and materials carried therein. The flexible ropes are located in grooves in the underside of the sheet. The grooves are cut in the rubber after curing of the mat on a cylindrical mandrel. The grooves are arranged to locate and protect the ropes against relative lateral movement and wear and tear. The provision of the ropes serves to freely support the elastomeric layer and thereby absorb high impact loads of bulk material falling onto the sheet. The freely supported mat which can be likened to a hammock style support is effective in absorbing high impact loads commonly encountered by this equipment.

OBJECT OF THE INVENTION

It is an objective of the present invention to provide a bulk material wear mat of elastomeric/polymeric material having good wear resistance characteristics and yet is relatively economical and simple to manufacture.

It is a further objective to provide improved support means for the wear mat that at least in part overcomes or minimises problems that are apparent in the prior art.

It is a further objective to provide an improved method of construction of a wear mat suitable for use in bulk material handling vehicles in which the mat is constructed from raw rubber on a mandrel and then cured and the thus formed cured rubber article forming a substantially flat planar mat having first and second opposed surfaces of relatively large area.

The rubber surface of the wear mat is arranged so that when the surface is laid in position the upwardly facing working surface of the wear mat is in compression whereas the opposing surface is in tension.

According to the present invention the opposed surface is located so that the rubber is in compression and is arranged to be located to receive the impact of loads imposed on the wear mat in use in a heavy duty haulage vehicle.

It is a further objective of the invention to provide a wear mat as defined which is suitable and adapted to fitting to a vehicle body and in whole or partly supporting the surface of the mat on a separate support mat which is adapted to locate and accommodate support ropes therein whereby the support ropes or cables are located and fixed in spaced apart relationship to provide an even support for the wear mat.

It is a further objective of the present invention to provide a heavy duty rear prevention insert of woven fabric of polyester or nylon yarn at the corners of the rear of the wear mat destined to be located at the rear of the haulage vehicle to prevent tearing and/or rupture damage to the rear corners of the wear mat in use.

In a further aspect of the invention the support mat or space of bars beneath the wear mat is securely anchored to the wear mat and the vehicle body to avoid relative movement of the wear mat and the vehicle body in use.

BRIEF DESCRIPTION OF THE DRAWINGS

FIG. 6 is an exploded perspective view of the wear mat and associated rope and space bar support.

DESCRIPTION OF THE PREFERRED EMBODIMENT

Figure 1:
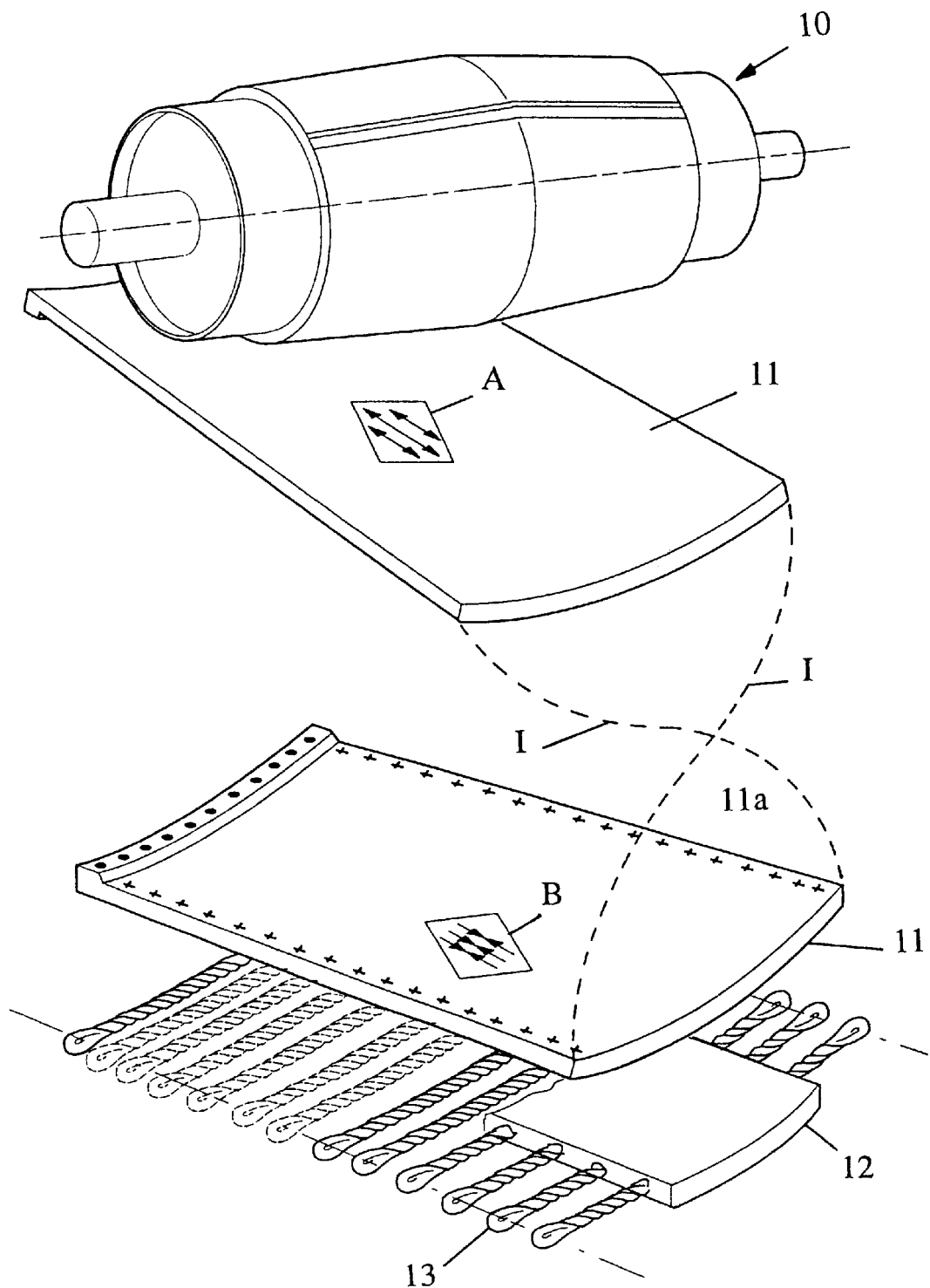
FIG. 1 is an exploded perspective view showing the method steps of were not inversion after removal from a cylindrical mandrel.

With reference to FIG. 1 there is shown a substantially cylindrical mandrel 10 which is rotatable and upon which can be built or applied an uncured synthetic rubber cylindrical article destined to form a wear mat 11.

The mat is conveniently formed upon the mandrel and then supported to a curing room not shown where the rubber undergoes vulcanisation by exposure to high temperature. Such building and vulcanisation techniques are conventional in the rubber treatment art.

After curing of the rubber the cylinder is cut to form a planar mat and is ready for assembly with a supporting mat or space bar support 12. Prior to assembly with the supporting mat the wear mat 11 is inverted by following broken lines in so that surface 11A is facing upwardly. In the manufacture of the wear mat on the cylindrical mandrel the mat surface 11A is originally formed on the outer surface of the rubber cylinder as built on the mandrel 10. This results in the rubber at the surface undergoing compression after cutting off the cylinder to form the substantially planar mat. A similar result would be achieved where the mat is formed in a flat condition and then curved to a convex configuration thereby placing the surface of the mat under compression. It has also been found that the opposing surface 11B of the wear mat has rubber which is subjected to tensile forces as a result of the stretching effect of laying the mat flat from the cylindrical formation. This tensile component is represented by arrows A and the compression component on side 11A is represented by arrows B.

Accordingly it is provided by the present invention that the surface of the mat when installed as a part of a wear mat for an off road vehicle will be in compression.

Figure 2:
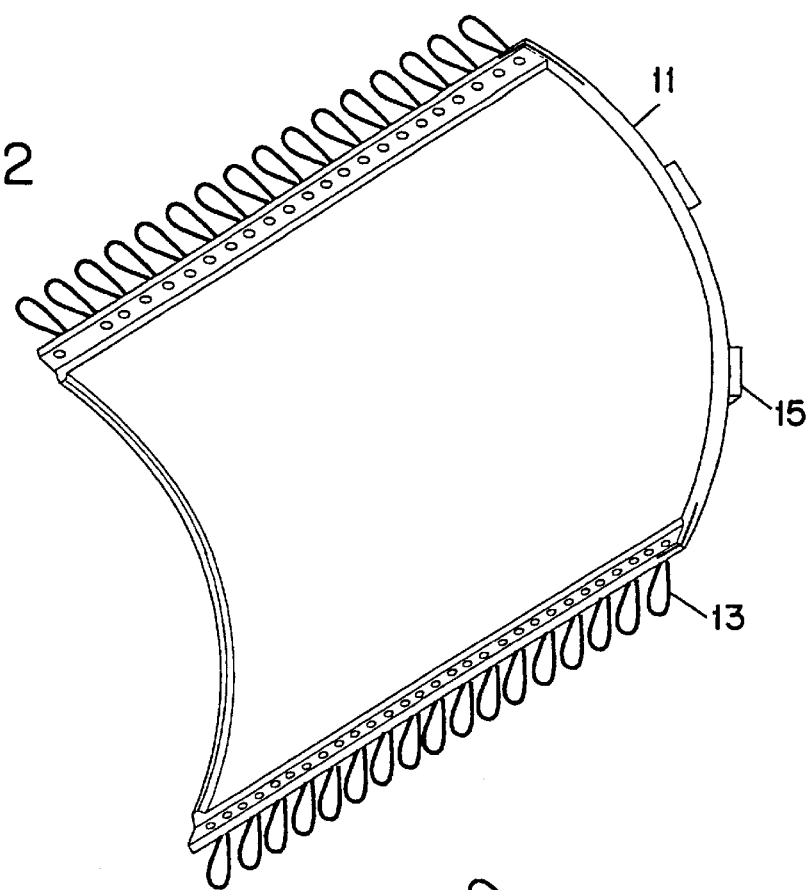
FIG. 2 is a perspective view from above of the wear mat and associated support bars and support cables.
Figure 3:
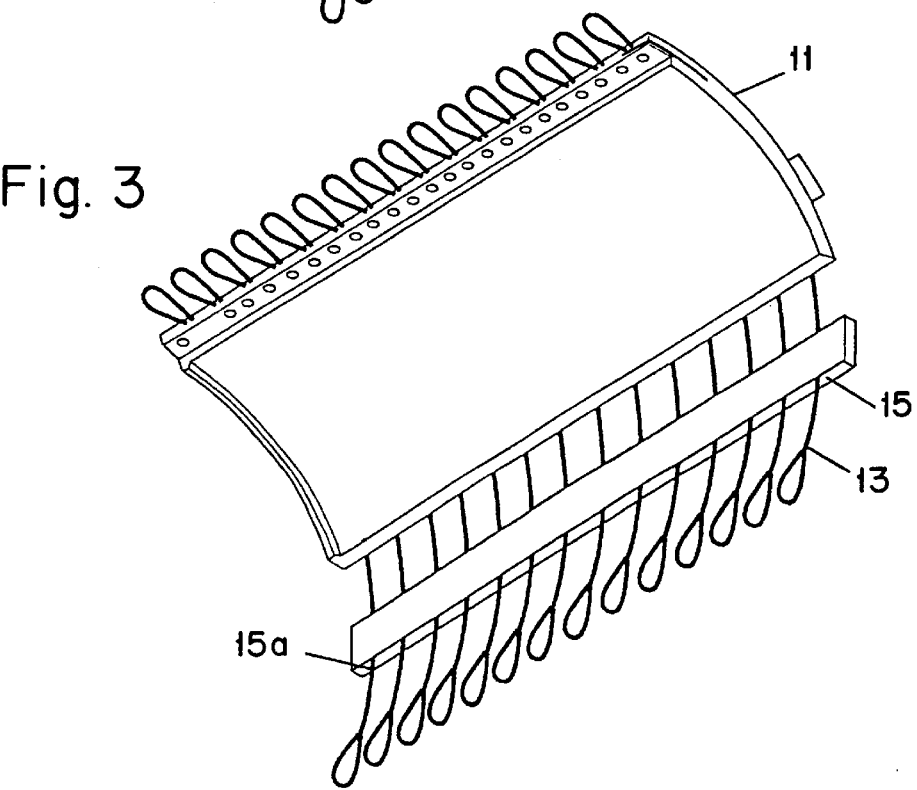
FIG. 3 is a partially cut away view of the wear mat of FIG. 2.

The inverted mat may then be supported on a support mat 12 which in turn is supported on support ropes 13 which are now be described in greater detail with reference to FIGS. 2 and 3 and 3A.

Conventionally ropes 13 have been located in groves formed in the underside of the wear mat 10 however with the present invention the formation of such groves is eliminated.

Spacer support bars 15 are provided which include apertures 15a to positively locate the suspension ropes 13 which are equally spaced along the length of support bar 15. Thus provided the spacer support bar 15 is securely anchored beneath the wear mat 11 the ropes will be maintained and located in equally spaced positions to ensure even support of the wear mat. This is necessary to ensure that the loads imposed upon the wear mat in use particularly from the impact of large rocks loaded onto the tray is properly absorbed by the combination effect of the wear mat and the equally spaced ropes.

If the ropes are allowed to move laterally greater cutting and wear stresses will be imposed both on the wear mat and the support ropes. Elimination of the locating groves previously necessary on the wear mat to locate the support ropes, decreases the chance of the ropes being displaced and furthermore increases the strength of the wear mat itself.

Figures 5, 5A:
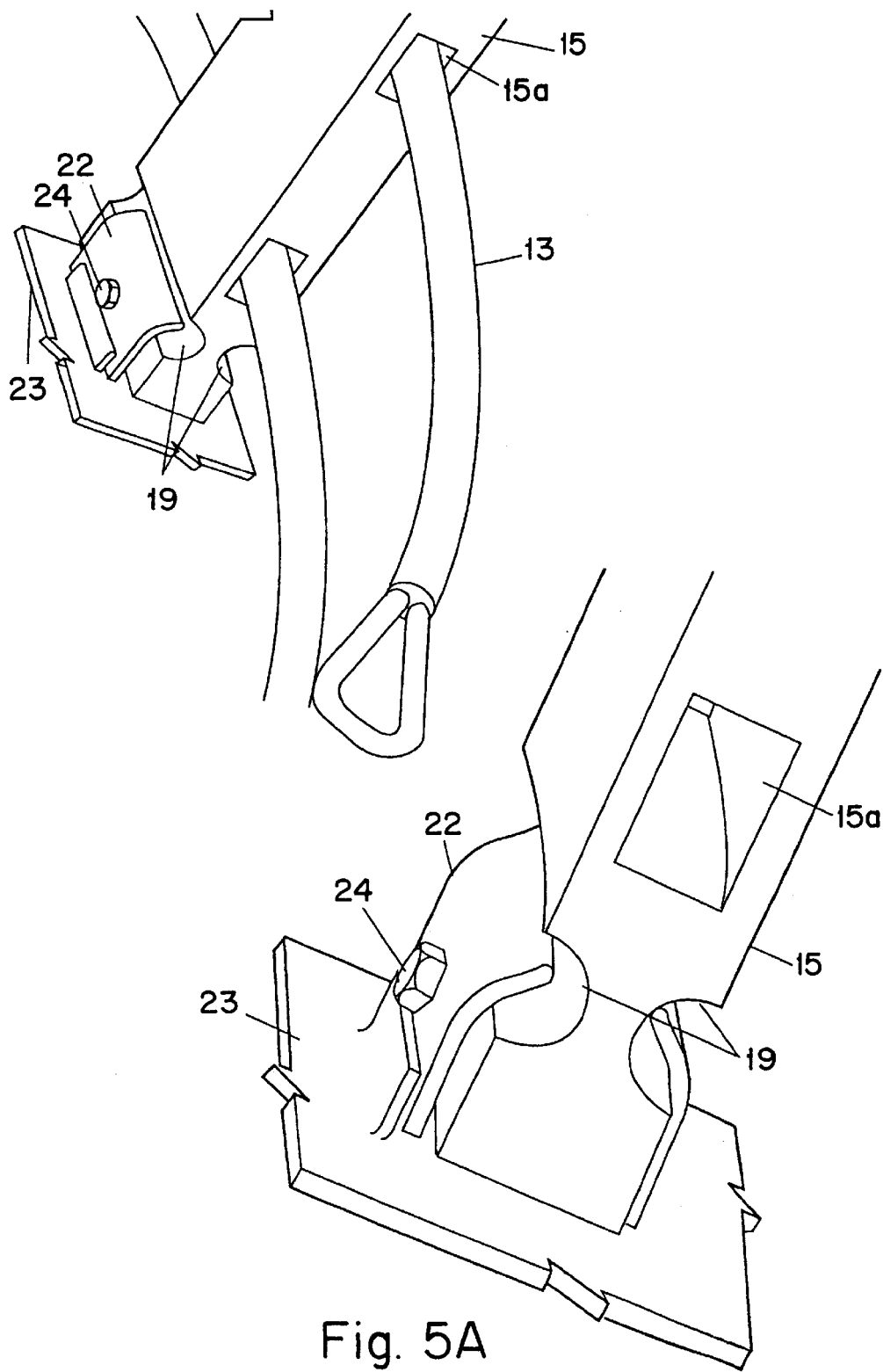
FIGS. 5 & 5A show the space and bar anchoring arrangement.

The spacer support bars 15 are firmly anchored to the vehicle to which the wear mat is to be fitted as best shown in FIGS. 5 & 5A.

The support bar is formed with a groove 19 to locate a clamping jaw 22 which is secured to the vehicle body 23 by bolt 24. Thus the clamping jaw 22 secures the support bar 15 from longitudinal and lateral movement relative to the wear mat and the vehicle body. The apertures 15a for locating the supports ropes 13 are clearly shown in FIGS. 5 & 5A.

Figure 3A:
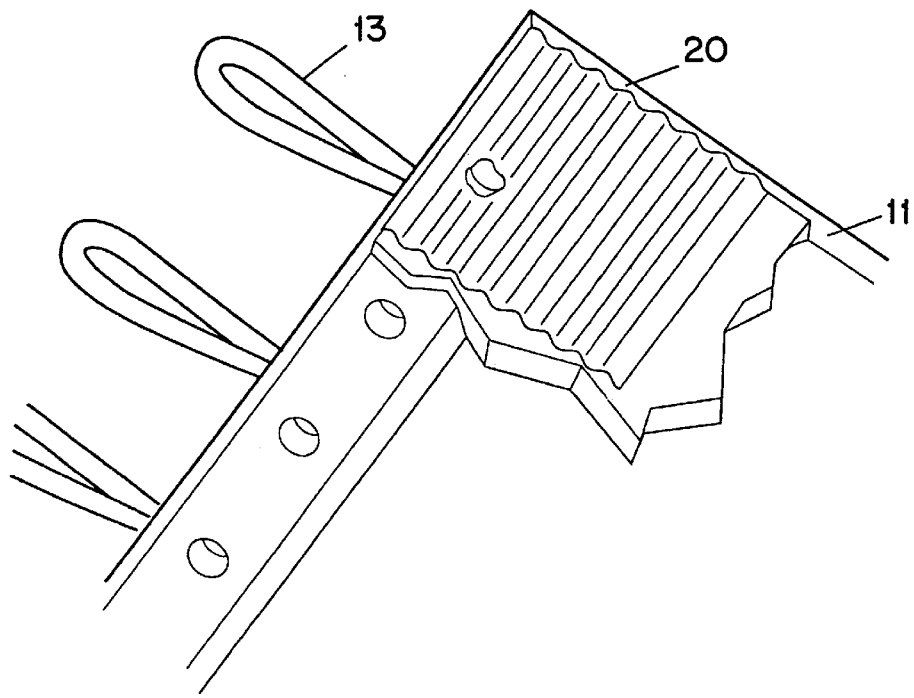
FIG. 3A is a partial view showing the heavy duty corner lining on the wear mat.

With reference to FIG. 3A of the drawings the corner section of the wear mat destined to be located at the rear corner of the dump body is reinforced with suitable polymeric fabric 20 as shown in detail in FIG. 3A. In use of the dump vehicle the rear corner of the wear mat constitutes a high wear area during dumping operations with the corner of the mat impacting upon the ground. The corners are therefore reinforced over the limited corner area with heavy duty woven fabric 20 of polyester or nylon yarn which fabric is embedded into the mat at the corners as shown so that the mat retains elasticity but is prevented from being worn or torn.

Figure 4:
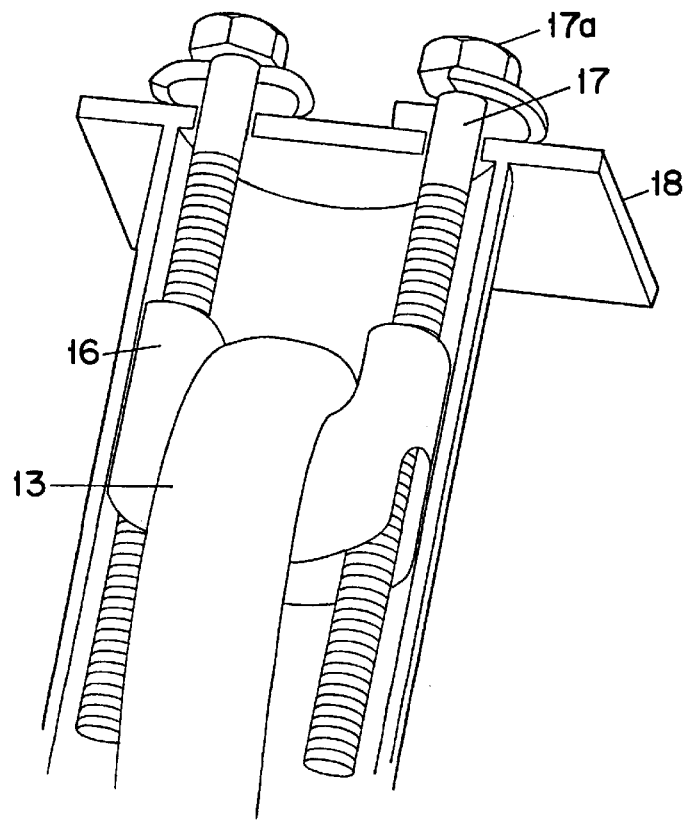
FIG. 4 is a partial view showing the adjustable rope support.

The ropes supporting the mat are individually adjustable as best shown in FIG. 4 which shows a rope collar 16 associated with clamp turnbuckles 17 which are secured to the vehicle sides 18 by adjustment of the bolt heads 17a. The tension in each of the ropes is individually adjustable to enable maintenance of equal support tension in the ropes underneath the mat.

With further reference to the formation of the wear mat and alternative method of ensuring that the surface exposed to impact and wear forces when in use is under compression, can be achieved by curing and building the wear mat on a fixed mould having a radius of curvature which is larger in size than the final radius of curvature which the wear mat will be installed in the haulage vehicle body. Alternatively the mat may be moulded flat and then located in use in a concave up configuration. This will mean that the upper surface of the wear mat will be under a compression component which will ensure that the objectives of the invention are achieved.

I claim:

1. A bulk material handling wear mat formed by a process comprising the steps of:

forming the wear mat on a cylindrical mandrel;

vulcanizing the formed wear mat;

cutting and removing the wear mat from the mandrel, the wear mat so formed having a first surface formed against the surface of the mandrel, and a second, opposing surface;

inverting the wear mat so that said second surface is a load contacting surface, said second surface being in compression and said first surface being in tension in the absence of an external load.

2. A bulk material handling wear mat as claimed in claim 1, further comprising an apertured space support bar having apertures, and a series of support ropes having individually adjustable tension means and which are maintained in substantially equally spaced locations relative to said first surface of said wear mat by said apertured space support bar, wherein said individual ropes are each located in one of each of said apertures in said apertured space support bar.

3. A bulk material handling wear mat in accordance with claim 1, wherein said process further comprises the step of cutting said wear mat to a desired shape.

4. A bulk material handling wear mat in accordance with claim 1, wherein said step of forming said wear mat comprises the step of forming said wear mat of a material comprising an elastomeric material.

5. A vehicle tray comprising:

a base;

a pair of opposed side walls;

a front wall;

at least one apertured support bar and a series of individually adjustable elongate support members maintained in substantially equal spacing by said at least one apertured support bar, each individual elongate support member being located in a separate aperture in said at least one apertured support bar and anchored in said pair of opposed side walls; and a wear mat in accordance with claim 1, said wear mat being installed such that said second surface, which is arranged to contact said load, is in compression and said first surface is in tension, said wear mat being supported on said series of individually adjustable elongate support members, said substantially equal spacing being maintained relative to said first surface of said wear mat by said least one apertured support.

6. A combination comprising:

a vehicle; and a vehicle tray in accordance with claim 5.

* * * * *